UNITED STATES PATENT OFFICE.

CHARLES E. SWETT, OF BROOKLINE, MASSACHUSETTS, ASSIGNOR TO ARTHUR D. LITTLE, INCORPORATED, OF CAMBRIDGE, MASSACHUSETTS, A CORPORATION OF MASSACHUSETTS.

ALCOHOLIC ZEIN SOLUTION.

1,320,508.      Specification of Letters Patent.      Patented Nov. 4, 1919.

No Drawing.      Application filed February 28, 1919. Serial No. 279,883.

*To all whom it may concern:*

Be it known that I, CHARLES E. SWETT, a citizen of the United States, residing at Brookline, in the county of Suffolk and State of Massachusetts, have invented certain new and useful Improvements in Alcoholic Zein Solutions, of which the following is a specification.

It is known that there may be extracted from maize or Indian corn, by alcohol or equivalent solvent, a protein substance to which the name "zein" has been given. It has useful technical qualities, for example as a varnish and cement when applied in alcoholic solution. By evaporation of the solvent the zein may be obtained as a transparent film.

A difficulty in the technical application of this material is the fact that the alcoholic solutions of zein, as heretofore obtained, unless quite dilute, tend to spontaneous coagulation. This change is permanent and irreversible, and is known as pectization.

A convenient material from which to extract zein is a by-product of the corn starch industry known as gluten meal. I have found that if gluten meal or crushed maize in any form be mixed with calcium carbonate, or equivalent therefor, it may then be extracted with a suitable solvent of the alcohol type, and the solutions so prepared will not coagulate, even at high concentrations. If dry zein be obtained from a solution prepared as above, it may be re-dissolved in an appropriate alcoholic solvent, and such secondary solution will also remain liquid without coagulation.

Instead of calcium carbonate other salts or compounds capable of neutralizing weak acids may be used; such for example as magnesium carbonate, tricalcium phosphate, etc. Alkaline earth oxids and hydroxids are likewise effective.

It is probable that the class of bodies mentioned above act as anti-acids in the alcoholic solution of zein, and that their efficiency is largely at least due to this effect. Also, the bodies mentioned above are substantially insoluble in alcohol, as well as in alcoholic solutions of zein, and the zein derived from a solution so prepared contains at most a trace, if any, of the neutralizing agent employed, or any reaction product therefrom.

Although I have found the above mentioned alkaline earth compounds to be effective, the object of this invention may be accomplished by the employment of any other substance capable of functioning in a similar manner. Such anti-acid additions as are mentioned above should be present in relative abundance during the extraction. This is for the reason that on account of their insolubility they must perforce act locally. I have employed with success amounts varying from 25% of the zein-containing material up to as much as 100%. Any proportion of the anti-acid addition in excess of 100% of the zein-containing material appears to be wasteful and serves no useful purpose. The lower limit for the addition cannot be definitely fixed, because a proportion less than 25% may be made effective, provided the mass is agitated during the extraction, or provided any other appropriate method be used for insuring abundant points of contact between the material to be extracted and the anti-acid substance.

The zein may be separated from these solutions by any appropriate method, such for example as evaporation of the solvent, precipitation by ether, or the like.

I claim:

1. Process of preparing alcoholic solutions of zein which are not liable to coagulation, which consists in extracting zein by an alcoholic solvent in presence of an anti-acid body substantially insoluble in the solvent.

2. Process of preparing alcoholic solutions of zein which are not liable to coagulation, which consists in preparing a mixture of the zein-containing substance with an anti-acid body, and extracting the mixture by an alcoholic solvent.

3. Process of preparing alcoholic solutions of zein which are not liable to coagulation, which consists in preparing a mixture of the zein-containing substance with an anti-acid body substantially insoluble in alcohol and extracting the mixture by an alcoholic solvent.

4. As a new composition of matter, an alcoholic solution of zein which is not liable to coagulation, even in relatively concentrated solution.

In testimony whereof, I affix my signature.

CHARLES E. SWETT.